United States Patent [19]

Hammes

[11] E Re. 28,874

[45] Reissued June 22, 1976

[54] MOLDED BARREL

[75] Inventor: Wilhelm Hammes, Munich, Germany

[73] Assignee: Mauser Kommanditgesellschaft, Cologne, Germany

[22] Filed: Feb. 25, 1974

[21] Appl. No.: 445,680

Related U.S. Patent Documents

Reissue of:

[64] Patent No.: 3,647,110
Issued: Mar. 7, 1972
Appl. No.: 27,629
Filed: Apr. 6, 1970

[30] Foreign Application Priority Data

Apr. 23, 1969 Germany ..... 1920515

[52] U.S. Cl. ..... 220/72; 206/509
[51] Int. Cl.[2] ..... B65D 7/42
[58] Field of Search ..... 206/503, 508, 509; 220/DIG. 1, 66, 72, 74, 39 R, 39 B; 222/143, 573; D9/170

[56] References Cited

UNITED STATES PATENTS

| | | | |
|---|---|---|---|
| 1,956,512 | 4/1934 | Müller | 220/DIG. 1 |
| 2,114,137 | 4/1938 | Conner | 206/503 |
| 2,181,905 | 12/1939 | McCrery | 220/DIG. 1 |
| 2,801,022 | 7/1957 | Evenblij | 220/39 B |
| 3,168,207 | 2/1965 | Noland et al. | 215/1 C |
| 3,203,576 | 8/1965 | Wout et al. | 220/39 R |
| 3,207,359 | 9/1965 | Heisler et al. | 206/509 |
| 3,219,230 | 11/1965 | Housz et al. | 220/39 R |

OTHER PUBLICATIONS

Modern Plastics, Nov. 1963, p. 94

*Primary Examiner*—William I. Price
*Assistant Examiner*—Stephen Marcus
*Attorney, Agent, or Firm*—George J. Netter

[57] ABSTRACT

One end wall of a molded barrel of thermoplastic material has a general plane and is provided with at least two depressions at opposite diametric sides. A tubular portion is located in each depression and *is* of one piece with the end wall, each of the tubular portions communicating with the interior of the barrel and terminating in the general plane. Reinforcing webs are provided in the respective depression at that side of the associated projection which faces at the middle of the one end wall and these reinforcing webs are each of one piece with the one end wall and the respective projection, bridging the respective depression.

10 Claims, 3 Drawing Figures

INVENTOR
WILHELM HANNES
BY Richard S. Sterbe
ATTORNEY

INVENTOR
WILHELM HAMMES
BY Michael S. Striker
ATTORNEY

MOLDED BARREL

Matter enclosed in heavy brackets [ ] appears in the original patent but forms no part of this reissue specification; matter printed in italics indicates the additions made by reissue.

BACKGROUND OF THE INVENTION

The present invention relates generally to barrels, and more particularly to blow-molded barrels.

Still more particularly, the present invention relates to blow-molded stackable barrels of thermoplastic materials.

It is known to provide blow-molded barrels of thermoplastic materials which in their normally upper end wall are provided with a closable inlet and outlet and a closable air escape opening. Such barrels can be stacked for economy of space requirements. It has been found, however, that in the known barrels of this type—particularly those having a large volumetric content—the safety of stacking and in particular the dimensional accuracy and precise positioning of the inlet and air escape openings with reference to the end wall on which they are provided, cannot be properly guaranteed in the manufacture of such barrels. The reason for this is that the inlet and outlet opening and the air escape opening, hereafter for the sake of convenience called the openings, are positioned in the region of the circumferential edge of the upper barrel end wall diametrically opposite one another. In this region there exist nonuniform shrinkage tension between the upper end wall and the circumferential wall of the barrel, caused by different material distributions. Once the blow-molded barrel is removed from the mold the shrinkage tensions acting in the region of the circumferential edge of the upper barrel end wall, cause the opening to assume radially outwardly inclined orientation with reference to a central longitudinal plane of the barrel passing between the openings. The result of this is two-fold, namely the development of deformations in the openings which must subsequently be removed in separate operating steps, and a nonsymmetrical configuration of the end wall in question. The development of deformations in the openings is particularly disadvantageous because the closure caps for the openings are of course prefabricated with a view towards compensating for allowable tolerance variations in the openings. If, however, the openings undergo the aforementioned deformations which must subsequently be eliminated by material removal, the allowable tolerance variations are exceeded and the closure caps can no longer tightly seal the openings.

SUMMARY OF THE INVENTION

It is accordingly, an object of the present invention to provide an improved mold barrel which is not possessed of the aforementioned disadvantages.

A more particular object of the present invention is to provide such a barrel which, while provided with a maximum contact face on its upper end wall for stacking purposes, is not subjected in the aforementioned change in the orientation of its openings during or subsequent to manufacture.

An additional object of the invention is to provide such a barrel wherein the openings are not subjected to dimensional variations, or at most to variations of such a magnitude that any subsequent compensation by material removal or by any other steps, is avoided.

In pursuance of the above objects, and others which will become apparent hereafter, one feature of the invention resides in the provision of a barrel of thermoplastic material which is blow molded and which, briefly stated, comprises a circumferential wall and a pair of spaced end walls one of which has a general plane. At least two depressions are provided in the aforementioned end wall at opposite diametric sides thereof, and a tubular portion is located in each depression and of one piece with the one end wall. Each of the tubular portions communicates with the interior of the barrel and terminates in the general plane. Reinforcing webs are provided in the respective depressions at that side of the associated projection which faces the middle of the one end wall, and these reinforcing webs are of one piece with the one end wall and the respective projection and bridge the respective depression.

With this construction, the reinforcing webs absorb the radially oppositely acting shrinkage tensions and force the tubular projections constituting the inlet and outlet opening and the air escape opening, respectively, into parallel positions in which they are symmetrical with reference to the longitudinal axis of the barrel, so that the upper edges bounding the outlet openings remain in the general plane of the one end wall, thus contributing together with this one end wall to providing stability for an additional barrel which is stacked upon the one end wall.

Located downwardly of the upper free edge of each of the projections, either below the respective web or constituting an interruption in the same, is a free space which serves to guarantee that the tubular projections would not undergo deformation. This results in excellent tension distribution within the tubular projections themselves during the shrinkage process, and is therefore particularly important.

Advantageously, the projections are cinched in radially inward direction downwardly of their upper edges and in fact downwardly of the location where they are of one piece with the respective reinforcing webs. This provides the inner circumferential surface of the respective projection with an inwardly tapering circumferential surface portion, and with a subsequently provided cylindrical circmferential surface portion. The tapering surface portion contacts a seal provided on the closure cap and the cylindrical surface portion contacts an inner free edge of the closure cap as will be subsequently discussed in detail.

With the construction according to the present invention, the orientation and dimensional accuracy of the tubular projections in precisely guaranteed and all portions of the projections which contributes to a sealing in conjunction with the closure caps are located in regions where shrinkage tensions are uniform and where variations therefore do not occur. Any tolerance variations acting via the webs on the nonconical portions of the tubular portions are compensated for on the internal threads provided in the tubular portions adjacent their upper free ends and which do not contribute to the sealing action.

The novel features which are considered as characteristic for the invention are set forth in particular in the appended claims. The invention itself, however, both as to its construction and its method of operation, together with additional objects and advantages hereof, will be best understood from the following description of specific embodiments when read in connection with the accompanying drawing.

DESCRIPTION OF THE PREFERRED EMBODIMENTS

Figure 1:
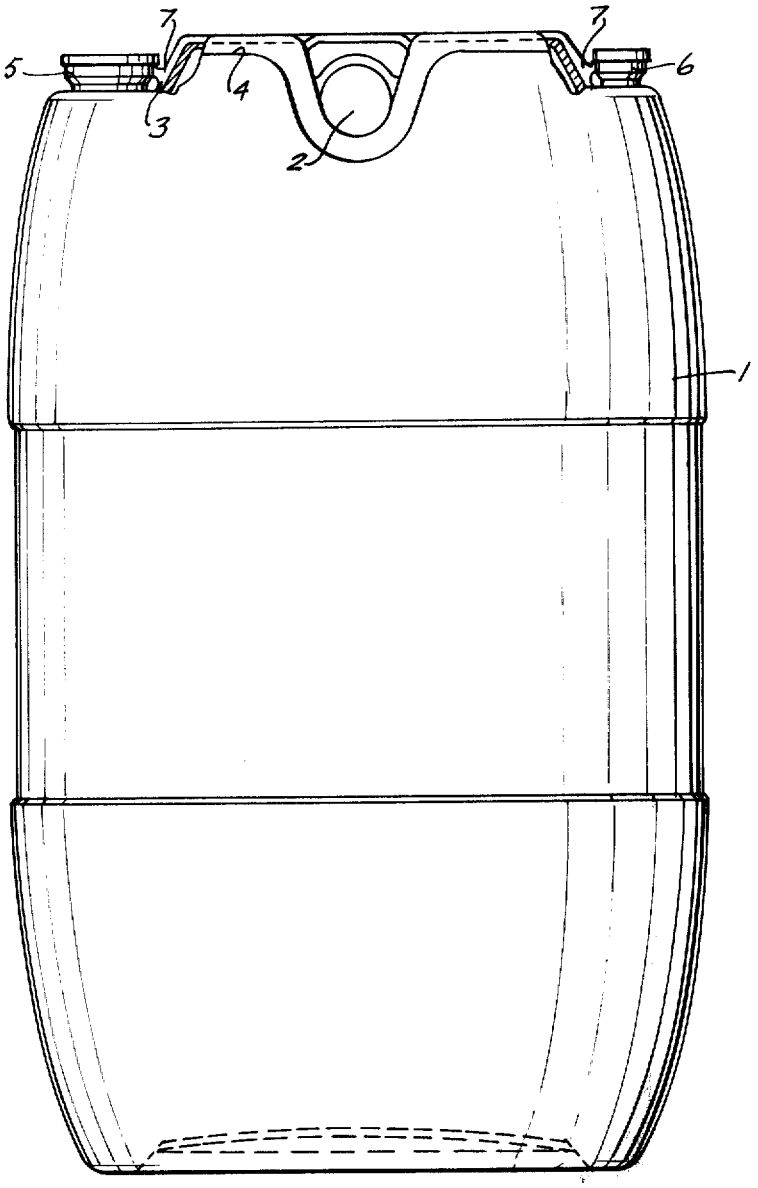
FIG. 1 is a somewhat diagramatic side view illustrating a barrel according to the present invention.
Figure 2:
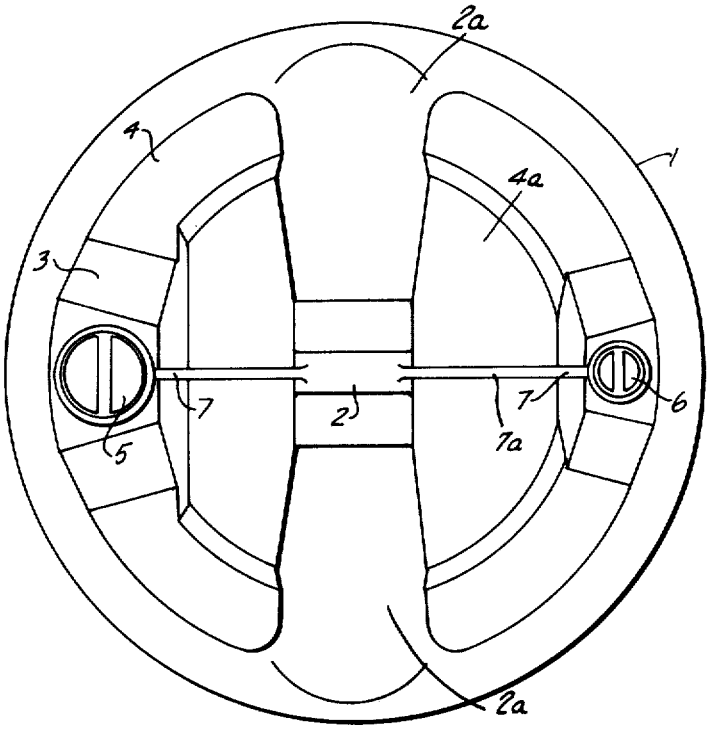
FIG. 2 is a top plan view of FIG. 1.

Discussing now the drawing in detail it will be seen that reference numeral 1 identifies the barrel in toto, and that the end wall which is normally uppermost for storage and transportation purposes, is provided with an eye 2 located in a recess 2a for engagement by the hook or similar instrumentality of a crane or other lifting device.

This wall is also provided at diametrically opposite locations with depressions 3 in its upper surface 4a, and the tubular projections 5 and 6 are arranged in these depressions 3 and communicate with the interior of the barrel 1. Their open edges are located in the general plane of the surface 4. Webs 7 are of one piece with the wall, as well as with the circumferential walls of the respective tubular projections 5,6 at those sides of the projections 5 and 6 which face inwardly towards the center of the barrel 1 beads 7a connect web 7 with eye 2.

Figure 3:
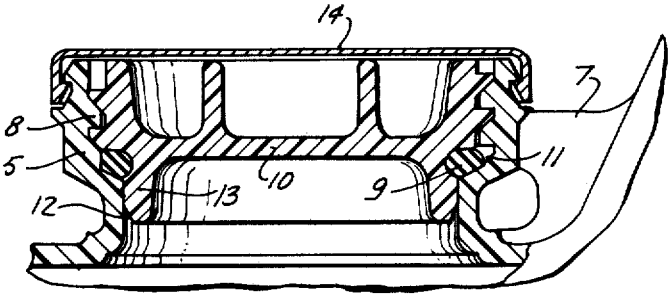
FIG. 3 is a fragmentary enlarged longitudinal section illustrating a detail of one of the projections in the barrel of FIGS. 1 and 2.

FIG. 3 shows particularly clearly that the webs 7 are connected only with the upper edge regions of the projections 5 and 6. In FIG. 3, only the projection 5 is shown in detail, but it will be understood that the projection 6 is similar and that the connection with the projection 6 of the associated web 7 is the same as shown in FIG. 3. Those portions of the projection 5—and these comments will also be understood to apply to the projection 6—which are directly concerned with the sealing function, are not in contact with the web 7.

The projections are provided in inner circumferential surfaces adjacent their open ends with screw threads 8, and downwardly of screw threads 8 there is provided an inwardly tapering conical sealing surface 11 against which a seal 9 mounted in the closure cap 10 which is threaded into the screw thread 8, and tightly abuts to provide a seal for the interior of the barrel. Following in inward direction after the conical sealing surface 11 is a cylindrical abutment surface 12 against which a circumferential tubular edge 13 of the cover member 10 abuts. This not only provides a reinforcing effect, but also an additional sealing effect. In fact, abutment of the surface 12 with the edge 13 in effect provides a presealing effect which serves to relieve the main seal 9 to a pressure resulting in the interior of the barrel 1 from movement of the contents during handling of the barrel is already absorbed by contact of the surface 11 and the edge 13, so that it does not exert any force on the seal 9.

A seal cap 14 is provided on the projection 5 and, of course, on the projection 6 to prevent the cover member 10 from becoming loosened when this is undesired. The cutout located below or extending through the web 7, may be additionally used, if desired, for further securing the cap or closure member 10 against undesired loosening, in a manner well known to those skilled in the art.

It will be understood that each of the elements described above, or two or more together, may also find a useful application in other types of constructions differing from the types described above.

While the invention has been illustrated and described as embodied in a molded barrel, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be provided by Letters Patent is set forth in the appended:

1. A barrel of thermoplastic material comprising a circumferential wall; a pair of spaced end walls one of which has a general plane; at least two depressions in said one end wall at opposite diametric sides thereof; a tubular [ projections ] *projection* located in each depression and being of one piece with said one end wall, each of said tubular projections communicating with the interior of said barrel and terminating in said general plane; and reinforcing webs in the respective depressions at that side of the associated projection which faces the middle of said one end wall, said reinforcing webs being of one piece with said one end wall and the respective projection, *each reinforcing web having an upper section* connected to [ said ] *its respective* projection [ only ] within the upper region *of said respective projection.* [ thereof so as to bridge the depression between said one end wall and the respective projection. ]

2. A barrel as defined in claim 1, wherein said barrel is blow molded, and wherein said webs reinforce said projections against dislocations resulting from the development of shrinkage stresses in said barrel subsequently to molding of the same.

3. A barrel as defined in claim 1, said projections each being provided with an inner circumferential surface; and further comprising internal screw threads provided in each of said inner circumferential surfaces adjacent the open ends of the respective tubular projections.

4. A barrel as defined in claim 1; said projections each having an inner circumferential surface which includes, at a location inwardly spaced from the respective open end of said projections, a first inwardly convergent scaling surface portion, and inwardly adjacent to the same a second cylindrical surface portion.

5. A barrel as defined in claim 4, wherein said projections have walls which are circumferentially cinched in inward directions to thereby provide said first inwardly convergent sealing surface portion.

6. A barrel as defined in claim 4, wherein said first sealing surface portion is conically convergent.

7. A barrel as defined in claim 4, wherein each of said projections has a first end merging with said one end wall and a free second end, the respective web being of one piece with the projection intermediate said ends;

and wherein said sealing surface portions are provided intermediate the respective first end and web.

8. A barrel as defined in claim 4; further comprising a closure member for each of said projections and each including a ring seal adapted for sealing engagement with the respective first sealing surface portion, and a circumferentially complete edge adapted for sealing engagement with the respective second sealing surface portion.

9. A barrel as defined in claim 4, said inner circumferential surfaces being provided with screw threads adjacent the respective open end; and wherein said closure members are cap-shaped and each include a transverse wall and an extension receivable in the respective open end and formed with screwthreads matingly engageable with these on the respective inner circumferential surface.

10. A barrel as defined in claim 9, said edge being a free edge of the respective extension.

* * * * *